No. 865,450. PATENTED SEPT. 10, 1907.
T. L. & T. J. STURTEVANT.
CLUTCH DEVICE.
APPLICATION FILED MAR. 28, 1907.
3 SHEETS—SHEET 1.
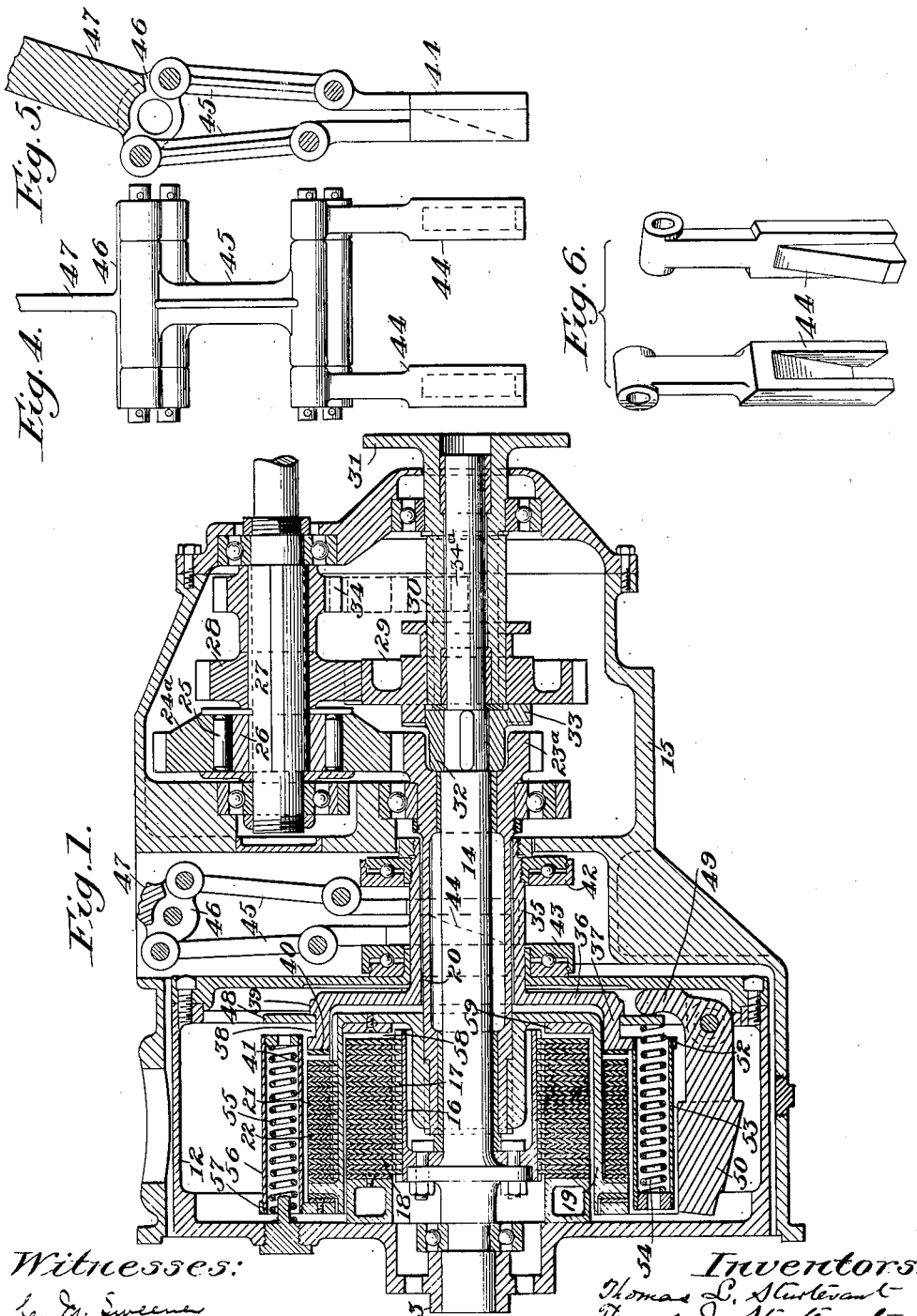

No. 865,450.  
PATENTED SEPT. 10, 1907.

T. L. & T. J. STURTEVANT.
CLUTCH DEVICE.
APPLICATION FILED MAR. 28, 1907.

3 SHEETS—SHEET 2.

Witnesses:

Inventors:
Thomas L. Sturtevant,
Thomas J. Sturtevant,
by
Att'ys.

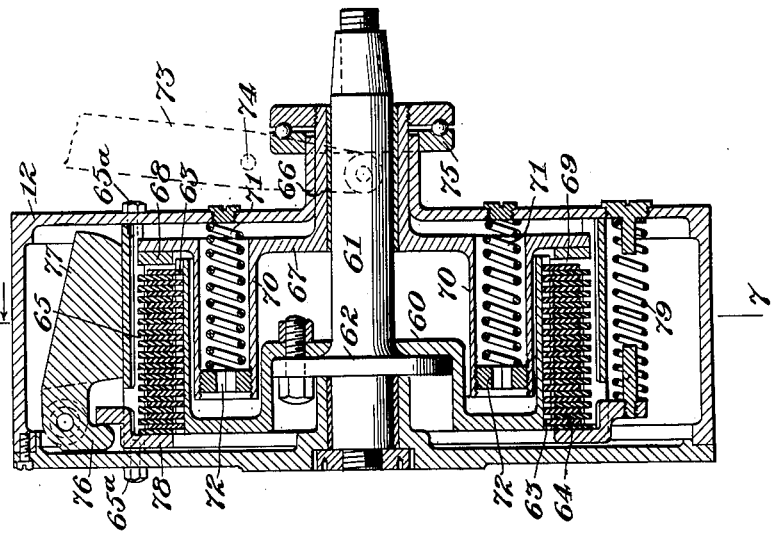

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CLUTCH DEVICE

No. 865,450.      Specification of Letters Patent.      Patented Sept. 10, 1907.

Application filed March 28, 1907. Serial No. 365,055.

*To all whom it may concern:*

Be it known that we, THOMAS LEGGETT STURTEVANT and THOMAS JOSEPH STURTEVANT, citizens of the United States, residing, respectively, at Quincy and Wellesley, in the county of Norfolk and State of Massachusetts, have invented or discovered certain new and useful Improvements in Clutch Devices, of which the following is a specification, reference being had therein to the accompanying drawings.

This invention relates to automatic-clutch, power-transmitting devices more particularly adapted for use with motor-vehicles, but which may be used for other purposes, if desired; the invention having for its principal object to provide an automatic clutch-device with manually controlled means whereby, when necessary, the clutch may be prevented from being set automatically; and also preferably whereby, when desired, the clutch may be set manually, if it should be found necessary or desirable to cause the engagement of the clutching parts at lower or different rotative speeds than those at which it is intended that the clutching parts are to be engaged automatically. The manual controlling device also provides means whereby the speed of the driven part may be regulated or varied without change of gearing, and without changing the speed of the driving part.

Figure 3:
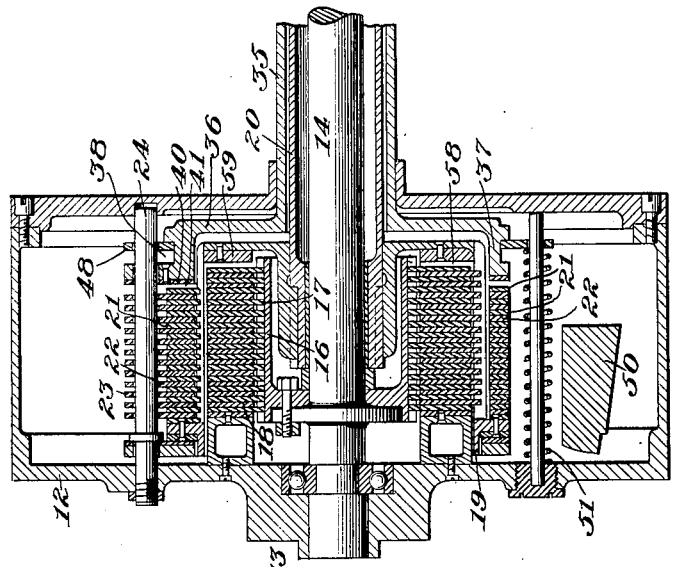
Figure 2:
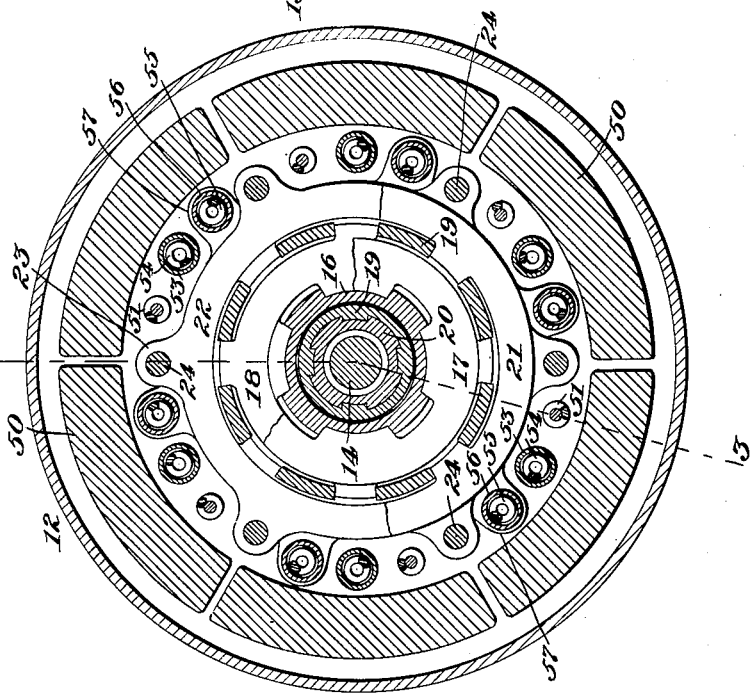

In the accompanying drawings, Figure 1 is a longitudinal section of a clutch-device power-transmitting mechanism embodying one form of the invention. Fig. 2 is a transverse section, partly broken away at different planes, through the fly-wheel clutch device. Fig. 3 is a longitudinal section through the fly-wheel clutch device on line 3—3, Fig. 2. Figs. 4, 5 and 6 are detail views of the manual controlling device. Fig. 7 is a transverse section of another form of the invention on line 7—7, Fig. 8, and Fig. 8 is a diametric section of the same on line 8—8, Fig. 7.

Referring to the drawings, 12 denotes a hollow fly-wheel which will be suitably connected at its hub 13 with an engine or other suitable source of power by which it may be driven, the chamber of said fly-wheel being preferably tightly inclosed so as to be adapted to contain a liquid lubricant. The fly-wheel 12 normally runs loose on a power-transmitting shaft 14 suitably supported in a gear box 15. Connected with the shaft 14, to rotate therewith, is a sleeve hub 16 surrounding which is a series of high-speed clutch disks or rings 17, having notched engagements at their inner parts with said sleeve hub, said clutch disks or rings alternating with other high-speed clutch disks or rings 18 having suitable notched engagements at their outer parts with a low-speed driving wheel or spider 19 the hub or central part of which is engaged with a sleeve 20, to rotate therewith, but which wheel or spider is mounted on said sleeve so as to be adapted to have a limited endwise sliding movement thereon. Surrounding the driving wheel or spider 19, and having notched engagements therewith at their inner parts, is a series of low-speed clutch-disks or rings 21 alternating with other low-speed clutch rings or disks 22 having peripheral ears 23 through which pass bolts 24 connecting them to the fly-wheel 12.

The sleeve 20 carries a pinion $23^a$ meshing with a gear-ring $24^a$ connected by grip rollers 25, forming a silent ratchet or clutch connection, with a hub 26 fast on the counter-shaft 27. The shaft 27 carries a gear 28 meshing with a gear 29 mounted on and having a splined connection with a driving sleeve 30 having at its outer end a flange or disk 31 from which power may be taken. Keyed to the power-transmitting shaft 14 is a hub 32 carrying teeth or projections forming members of a grab-clutch 33 the other teeth or members of which are formed on the gear 29; and thus the said gear 29 and the driving sleeve 30 may be driven directly from the shaft 14 when the high-speed clutch is in operation, and at which time the low-speed gear ring $24^a$ can overrun; said overrunning operation being the same as that fully described in our U. S. Patent No. 766,552. The gear 29 is adapted to be shifted endwise on the sleeve 30, for the reverse drive, so as to be brought into driving connection with a gear 34 through an idle gear $34^a$, indicated by dotted lines, as is common with motor-vehicle gearing mechanism.

Loosely surrounding the low-speed driving sleeve 20 is a sleeve 35 forming part of a manual controlling device. The sleeve 35 carries, within the fly-wheel 12, a wheel 36 having a horizontal flange 37 provided at its periphery with an annular notch 38 and an annular rib 39. At the inner end of said flange 37 is an abutment ring 40 between which and the adjacent clutch ring or disk 21 is a suitable clearance space 41, when the parts are out of clutching engagement. The sleeve 35 is provided with a thrust-collar or flange 42 suitably secured thereto and between which and an abutment part or collar 43 are arranged wedges 44 the shanks of which are connected by links 45 with the arms of a tilting-lever or walking-beam 46 provided with an operating lever or arm 47 which may be extended to form a suitable handle to be within reach of the driver, or which may be connected with a suitable pedal to be operated by the foot of the driver.

Seated in the annular recess 38 of the flange 37 connected with the controlling sleeve 35, is a ring or annular master-plate 48 against the outer side of which the toes 49 of the centrifugal weights 50 impinge, so that when the said weights are thrown out by centrifugal force the said master-plate or ring will be moved to the left, Fig. 1. The centrifugal weights 50 are normally held inward, or in their inoperative positions, by the stress of springs 51 bearing against the master-plate or ring 48 and preferably interposed between said master-plate or ring and the opposite inner wall of the fly-wheel 12.

The horizontal flange 37 has at its inner end peripheral projections 52 to which are screwed or otherwise suitably attached casings 53 inclosing what are termed safety relief springs 54 the inner ends of which impinge against the master plate or ring 48. The said springs 54 are sufficiently stiff so that when the master-plate is forced to the left, Fig. 1, by the toes of the centrifugal weights, it will also, through the said springs 54, carry the parts 37, 36, and 35 to the left, and thereby close up the clearance between the ring 40 and the adjacent clutch ring 22, thus forcing the low-speed clutch rings or disks into frictional driving engagement with each other, and causing the rotative movement of the fly-wheel to be imparted to the low-speed driving wheel or spider 19 to set the low-speed gearing train into operation. A still further inward movement of the master-plate or disk 48, by the toes of the centrifugal weights 50, as the said weights are thrown further outward centrifugally by a higher rotative speed of the fly-wheel, will cause the entire series of low-speed clutch disks to be moved further to the left, Fig. 1, against the stress of the springs 55 preferably inclosed within casings 56 attached to a ring 57 having a limited sliding movement on the driving wheel 19. When the said driving wheel is moved far enough to the left to close the clearance 58 which normally exists between the contact ring 59, carried by said driving wheel, and the adjacent high-speed clutch disk or ring 17, the high-speed clutch disks or rings will be forced into clutching engagement with each other and the rotative movement of the fly-wheel will then be transmitted directly to the hub 16 secured to the shaft 14, and thus the said shaft and the driving sleeve 30 connected therewith will receive the full rotative speed of the fly-wheel through the low-speed clutch device connected with the said fly-wheel. It will thus be understood that the high-speed clutch device is driven from the low-speed clutch device, and within which latter the high-speed clutch device is nested in the fly-wheel, thereby permitting the use of a large number of clutch rings or disks, to provide strong clutching devices, within a comparatively small space, contributing to compactness of construction.

As the centrifugal weights, by which the clutch disks or rings are forced into frictional clutching engagement with each other when the driving part reaches a predetermined speed of rotation, are normally held inward by the stress of the springs 51, acting on said centrifugal weights through the master-plate 48, it will be understood that the clutch rings or disks are normally disengaged, so that no movement will normally be imparted to the driven part from the driving part through the clutch or clutches; but when the rotative speed of the driving part is sufficient so that the stress of said springs is overcome by centrifugal force the clutch disks or rings are automatically forced into frictional engagement with each other by said centrifugal weights and power is then transmitted to the driven part or shaft.

As hereinbefore stated the invention has for its object to provide a manually-controlled automatic clutch device, so that the clutching parts may be held out of engagement, when desired, when the driving part or fly-wheel, or the engine with which said driving part or fly-wheel is so connected as to run therewith, may be running at speeds which would otherwise cause the clutching parts to be automatically engaged; as also preferably to provide manually controlled means whereby the clutching parts may be engaged at speeds lower than those at which they would be automatically thrown into engagement by the rotation of the driving part.

An embodiment of the invention in its simplest form is shown in Figs. 7 and 8 in which the fly-wheel 12 is shown as being provided with a single-speed clutch device. In this form of the invention a driving wheel 60 is rigidly attached to the power-transmitting or driven shaft 61, said shaft being preferably provided with a flange 62 to which said driving wheel is secured. Surrounding the said driving wheel 60, and having notched engagements therewith at their inner parts, is a series of clutch disks or rings 63 alternating with other clutch disks or rings 64 engaging a ring or shell 65 secured to the fly-wheel casing by bolts 65$^a$ passing through the fly-wheel; or the said clutch disks or rings 64 may be otherwise connected with said fly-wheel to rotate therewith. Suitably mounted for endwise sliding movement relative to the shaft 61 is a sleeve 66 having a wheel 67 disposed within the fly-wheel 12 and provided with an annular master-plate or ring 68 between which and the nearest adjacent clutch disks or rings 63, when the clutching parts are disengaged and the shaft 61 is at rest, is a suitable clearance 69. The wheel 67, which may be termed a controlling wheel, is provided with suitable sleeves or housings 70 within which are arranged springs 71 pressing against the inner wall of the fly-wheel and suitable stops 72 in the said sleeves or housings, so that said springs have a tendency to force the controlling wheel 67 to the left, Fig. 8. This tendency is, however, resisted by a controlling fork or lever 73 pivoted at 74 and engaging at its inner end a collar 75 so connected with the sleeve 66 of the controlling-wheel 67 that it is movable with said sleeve. Suitable means will, of course, be provided to retain the controlling lever in any desired position, while at the same time permitting it to be moved by the driver or attendant to different positions. Thus if the said controlling lever be held in the position shown in Fig. 8 a suitable rotative speed of the fly-wheel will cause the toes 76 of the centrifugal weights 77 to force the master-plate 78 inward against the stress of the relief springs 79, and thereby move the clutch disks or rings to the right, Fig. 8, so as to close the clearance 69 and thus force the clutch disks or rings into frictional engagement with each other to set the power-transmitting shaft 61 in motion through the driving wheel 60. If, however, it be desired to prevent the clutch from being set into clutching operation at such rotative speed of the fly-wheel as will throw the free ends of the centrifugal weights fully outward into contact with stops on the inner wall of the fly-wheel, the controlling lever 73 may be manually operated to force the controlling wheel 67 to the right, Fig. 8, against the stress of the springs 71, far enough to afford such a wide clearance at 69 as will not be closed by the full movement of the master-plate 78 under the influence of the said centrifugal weights; and thus however high the speed of rotation of the fly-wheel may be the clutching operation of the clutch device will be prevented. If it be desired to throw the clutch into operation at rotative speeds lower than those which would normally effect the clutching operation automatically the controlling lever 73 will be so placed or moved as to permit the springs 71 to force the controlling wheel 67 to the left far enough to close the clearance 69 and thus cause the master-plate 68 carried by said wheel to force the clutching disks into frictional engagement with each other and thereby set the shaft 61 into rotation It will therefore be seen that the springs 71 coöperate with the manual controlling device or lever 73; and are controlled in their action by manual manipulation, and may, therefore, properly be termed "manual-control" springs; while the springs 79 coöperate with the automatically-operating centrifugal weights 7 7 and may therefore properly be termed "automatic-control" springs. So also in the form of the invention shown in Figs. 1, 2 and 3, the springs 54 are the "manual-control" springs in that they have a tendency to force the controlling sleeve 35 to the left to close the clearance space 41 and set the low-speed clutch, and this tendency is controlled by the sliding wedges of the manual controlling device; while in this form of the invention the springs 51, which normally hold the centrifugal weights 50 outward, are the "automatic-control" springs. It will thus be understood that in the construction afforded by the invention the automatically acting or centrifugal clutch device is supplemented by manually operated controlling means by which the attendant or driver may at any time, or at any running speed of the driving part, throw the normally automatically-operating clutch-device into or out of clutching action; the controlling lever 73 being, of course, suitably arranged or connected either for hand or foot operation.
Owing to the fact that the chamber of the fly-wheel, which serves as a casing or housing for the entire clutch device, is tightly closed, so as to be adapted to contain and hold a liquid lubricant, as hereinbefore stated, the clutch disks may be run in oil, so that they can slip on each other, more or less, without heating. This feature is not only desirable in changing from one speed to another, when change-gears are employed, as it permits the changes to be effected without any sudden jerks or jars, but is particularly desirable in connection with a manual controlling device by which the automatic clutching action may be retarded or hastened, in that by lessening the frictional pressure of the clutch disks against each other the slip of said disks on each other may be increased or augmented, so that a lower speed will be imparted to the driven part, without changing the running speed of the driving part, or without change of gearing; and, conversely, by increasing the frictional pressure of the clutch disks against each other, by the manual controlling device, the slip of the clutch disks on each other may be lessened so as to increase the speed of the driven part relative to the speed of the driving part, if the frictional clutch pressure be such, when the device is running, as to permit of such slip. For example, if the clutch device be so constructed, relative to the vehicle or other device intended to be driven, that the clutch disks will run without any slip relative to each other when a frictional clutch pressure of 20 pounds to the square inch is applied to said disks, it will be obvious that by lessening such frictional clutch pressure, through the medium of the manual controlling device, more or less slip of the clutch disks relative to each other will at once occur; and thus the speed of the driven part will be lessened without changing the running speed of the driving part and without change of gearing, if such be employed.

While the invention, in its preferred form, includes multiple disks as the clutching elements of the clutch device or devices, and while the centrifugally acting automatic means for effecting the clutching engagement of the clutch members will preferably be utilized, it will be understood that other forms of clutching devices than those of the multiple-disk type may be employed; and that other automatic means than centrifugally acting means may be utilized, without departing from the essence or scope of the invention as summarized in the appended claims.

Having thus described our invention we claim and desire to secure by Letters Patent:

1. In a power-transmitting mechanism, adapted for use in motor vehicles, the combination with driving and driven parts, of a normally disengaged, multiple-disk friction clutch device, automatic means for forcing the parts thereof into clutching engagement when said driving part reaches a certain predetermined speed of rotation, and a manual device by which the frictional clutch pressure of the clutching disks against each other may be controlled so that the clutching action of the clutch device may be effected or prevented and also so that the speed of the said driven part may be regulated or varied without changing the running speed of the driving part.

2. In a power-transmitting mechanism, adapted for use in motor vehicles, the combination with driving and driven parts and a closed casing adapted to hold a liquid lubricant, of a multiple-disk, friction clutch device tightly inclosed within said casing, automatic means for forcing the parts of said clutch device into clutching engagement when said driving part reaches a certain predetermined speed of rotation, and a manual device by which the frictional clutching pressure of the said disks against each other may be controlled so that the clutching action of the clutch device may be effected or prevented and also so that the speed of the said driven part may be regulated or varied without changing the running speed of the said driving part.

3. In a power-transmitting mechanism, adapted for use in motor vehicles, the combination with driving and driven parts and a closed casing adapted to hold a liquid lubricant, of a multiple-disk friction clutch device tightly inclosed within said casing, automatic means, also inclosed within said casing, for forcing the parts of said clutch device into clutching engagement when said driving part reaches a certain predetermined speed of rotation, and a manual device by which the frictional pressure of the said disks against each other may be controlled so that the clutching action of the clutch device may be effected or prevented and also so that the speed of the said driven part may be regulated or varied without changing the running speed of the said driving part.

4. In a power-transmitting mechanism, adapted for use in motor vehicles, the combination with driving and driven parts and a closed casing adapted to hold a liquid lubricant, of a multiple-disk, friction clutch device tightly inclosed within said casing, centrifugally acting means also inclosed within said casing, for forcing the parts of said clutch device into clutching engagement, and a manual device by which the frictional clutching pressure of the said disks against each other may be controlled so that the clutching action of the clutch device may be effected or prevented, and also so that the speed of the said driven part may be regulated or varied without changing the running speed of the said driving part.

5. In a power-transmitting mechanism, adapted for use with motor-vehicles, the combination with a tightly-closed fly-wheel adapted to hold a liquid lubricant, of a normally-disengaged, multiple-disk clutch-device inclosed within the same, automatic means, also inclosed within said fly-wheel, for forcing the parts of the said clutch device into clutching engagement when a certain predetermined speed of rotation is reached, and a manual controlling device for the said automatic clutch device.

6. In a power-transmitting mechanism, adapted for use with motor vehicles, the combination with a tightly closed fly-wheel adapted to hold a liquid lubricant, of a normally-disengaged, clutch-device inclosed within the same, centrifugally actuated means, also inclosed within said fly-wheel, for forcing the parts of the said clutch device into clutching engagement, and a manual controlling device for the said centrifugally engaged clutch device.

7. In a power-transmitting mechanism, the combination with driving and driven parts, of high and low speed, multiple-disk clutch devices, one nested within and being driven by the other.

8. In a power-transmitting mechanism, the combination with driving and driven parts, of high and low-speed clutch devices, one nested within and being driven by the other, and manual controlling devices for the said clutch-devices.

9. In a power-transmitting mechanism, the combination with a driving and driven part, of high and low speed, multiple-disk clutch-devices, automatic means for forcing the clutching parts thereof into clutching engagement, and a manual controlling device whereby the automatic clutch action may be prevented when desired.

10. In a power-transmitting mechanism, the combination with a normally-disengaged clutch-device and centrifugally-acting, automatic means, housed within a rotating part, for forcing the clutching parts thereof into clutching engagement, of a manual controlling device for said clutch device whereby the automatic engagement of the clutch device may be prevented, or whereby the clutching engagement of said parts may be effected independently of the centrifugally-acting automatic engaging devices.

11. In a power-transmitting mechanism, the combination with a driving and a driven part, of a normally disengaged clutch device, automatic means for causing engagement of the clutching parts when the driving part reaches a certain predetermined speed of rotation, for the purpose of setting the driven part in motion, a manual controlling device by which clutch engagement of the parts may be prevented or effected, one or more "manual-control" springs and one or more "automatic-control" springs coöperating, respectively, with the manual controlling device and the automatic clutch-engaging means.

12. In a power-transmitting mechanism, the combination with a driving and a driven part, of a normally disengaged clutch device, a fly-wheel within which said clutch device is inclosed, automatic means within said fly-wheel for causing engagement of the clutching parts when the driving part reaches a certain predetermined speed of rotation, for the purpose of setting the driven part in motion, a manual controlling device, outside said fly-wheel, by which clutch engagement of the parts may be prevented or effected, one or more "manual-control" springs and one or more "automatic-control" springs coöperating, respectively, with the manual controlling device and the automatic clutch-engaging means.

13. In a power-transmitting mechanism, the combination with a driving and a driven part, of a normally disengaged multiple-disk clutch device, centrifugally-controlled means for causing engagement of the clutching parts when the driving part reached a certain predetermined speed of rotation, for the purpose of setting the driven part in motion, a manual controlling device by which clutch engagement of the parts may be prevented or effected, one or more "manual-control" springs and one or more "automatic-control" springs coöperating, respectively, with the manual controlling device and the automatic clutch-engaging means.

14. In a power-transmitting mechanism, the combination with a driving and a driven part, of a normally disengaged clutch device, a fly-wheel within which said clutch device is inclosed, centrifugally-controlled means within said fly-wheel for causing engagement of the clutching parts when the driving part reaches a certain predetermined speed of rotation, for the purpose of setting the driven part in motion, a manual controlling device, outside said fly-wheel, by which clutch engagement of the parts may be prevented or effected, one or more "manual-control" springs and one or more "automatic-control" springs coöperating, respectively, with the manual controlling device and the automatic clutch-engaging means.

In testimony whereof we affix our signatures, in presence of two witnesses.

THOMAS LEGGETT STURTEVANT.
THOMAS JOSEPH STURTEVANT.

Witnesses:
W. H. ELLIS,
L. H. STURTEVANT.